United States Patent
Aoyagi et al.

(10) Patent No.: US 9,789,568 B2
(45) Date of Patent: Oct. 17, 2017

(54) SOLDER, ALUMINUM WIRE BODY AND MOTOR USING THE SAME

(71) Applicant: Hitachi, Ltd., Chiyoda-ku, Tokyo (JP)

(72) Inventors: Takuya Aoyagi, Tokyo (JP); Motomune Kodama, Tokyo (JP); Takashi Naito, Tokyo (JP); Tadashi Fujieda, Tokyo (JP); Yuichi Sawai, Tokyo (JP); Masanori Miyagi, Tokyo (JP); Haruo Akahoshi, Tokyo (JP); Norihisa Iwasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 630 days.

(21) Appl. No.: 14/177,988

(22) Filed: Feb. 11, 2014

(65) Prior Publication Data
US 2014/0285039 A1  Sep. 25, 2014

(30) Foreign Application Priority Data

Mar. 25, 2013  (JP) ................................ 2013-061761

(51) Int. Cl.
*B22F 5/00* (2006.01)
*B23K 35/02* (2006.01)
(Continued)

(52) U.S. Cl.
CPC ........ *B23K 35/025* (2013.01); *B23K 35/0227* (2013.01); *B23K 35/0233* (2013.01); *B23K 35/0244* (2013.01); *B23K 35/262* (2013.01); *B23K 35/282* (2013.01); *B23K 35/286* (2013.01); *B23K 35/302* (2013.01);
(Continued)

(58) Field of Classification Search
None
See application file for complete search history.

(56) References Cited

U.S. PATENT DOCUMENTS 4,945,071 A * 7/1990 Friesen ................... C03C 3/122
  106/1.14
5,543,366 A * 8/1996 Dietz ...................... C03C 3/122
  106/1.14
(Continued)

FOREIGN PATENT DOCUMENTS

CN  1132673 A  10/1996
CN  1305403 A  7/2001
(Continued)

OTHER PUBLICATIONS

Chinese-language Office Action issued in counterpart Chinese Application No. 201410039079.9 dated Aug. 19, 2015 (eight (8) pages).
(Continued)

*Primary Examiner* — Daniel J Schleis
(74) *Attorney, Agent, or Firm* — Crowell & Moring LLP (57) ABSTRACT

An aluminum wire body, in which an aluminum or aluminum alloy electric wire and a metal to be joined are joined by solder, wherein the solder includes an oxide glass including vanadium and a conducting particle. Preferably, the conducting particle contained in the solder is 90% by volume or less and the oxide glass is 20% by volume to 90% by volume. Further preferably, the oxide glass includes 40% by mass or more of $Ag_2O$ in terms of oxides and the glass transition point is 180° C. or less.

12 Claims, 5 Drawing Sheets

(51) Int. Cl.
  *H02K 3/02* (2006.01)
  *B23K 35/36* (2006.01)
  *B23K 35/26* (2006.01)
  *B23K 35/28* (2006.01)
  *B23K 35/30* (2006.01)
  *B23K 35/32* (2006.01)
  *H01R 4/02* (2006.01)
  *H01R 4/62* (2006.01)

(52) U.S. Cl.
  CPC .......... *B23K 35/3006* (2013.01); *B23K 35/32* (2013.01); *B23K 35/3602* (2013.01); *H02K 3/02* (2013.01); *H01R 4/023* (2013.01); *H01R 4/625* (2013.01)

(56) References Cited

U.S. PATENT DOCUMENTS

| | | |
|---|---|---|
| 5,942,185 A | 8/1999 | Nakatsuka et al. |
| 6,416,863 B1 | 7/2002 | Schulze et al. |
| 2009/0189475 A1 | 7/2009 | Shin |

FOREIGN PATENT DOCUMENTS

| | | | |
|---|---|---|---|
| CN | 101499687 | A | 8/2009 |
| CN | 201320957 | Y | 10/2009 |
| JP | 5-175254 | A | 7/1993 |
| JP | 2004-169599 | A | 6/2004 |
| JP | 2006-179369 | A | 7/2006 |
| JP | 2006179369 | * | 7/2006 |
| JP | 2010-9794 | A | 1/2010 |
| JP | 2013-32255 | A | 2/2013 |
| WO | WO 2013/024829 | A1 | 2/2013 |
| WO | WO 2013/038621 | A1 | 3/2013 |

OTHER PUBLICATIONS

Taiwanese Office Action dated Mar. 24, 2015 (Four (4) pages).
Korean Office Action dated Apr. 10, 2015 (Five (5) pages).

* cited by examiner

SOLDER, ALUMINUM WIRE BODY AND MOTOR USING THE SAME

BACKGROUND OF THE INVENTION

1. Field of the Invention

The present invention relates to lead-free solder to join an aluminum electric wire, an aluminum wire body having a connected portion joined by solder and a motor using the aluminum wire body.

2. Description of the Related Art

Until now, cooper and a cooper alloy have commonly used for conducting wires in cables used for automobiles, motors and the like. In general, these conducting wires can sufficiently conduct electricity by pressing and crimping terminals, and thus operations have been easy and connection with high electric reliability has been possible.

Cooper electric wires, however, have a heavy weight and are expensive, and thus have a problem in which the requirements of weight reduction and cost reduction which are required for automobiles, motors and the like in recent years cannot be sufficiently dealt with. Aluminum and an aluminum alloy therefore have started being examined as alternative materials for copper electric wires. When a copper electric wire is substituted for an aluminum electric wire, approximately 30 to 40% reduction as the weight reduction effect of the electric wire itself and approximately 50% reduction as material costs are expected.

There are, however, problems in that when aluminum is used for wiring, because an oxidation rate on surfaces is high, soldering processing is difficult, and when a connection method by pressing and crimping as usual is used, because a stress relaxation is likely to occur even at normal temperature after connection, the reliability of electrical connection is not obtained.

For this reason, as shown in JP 2006-179369 A, a method by inserting an aluminum electric wire into a bottom surface using a special terminal and soldering the bottom surface portion, followed by crimping is disclosed.

SUMMARY OF THE INVENTION

As described above, however, solder is generally less prone to attach to an aluminum wire, and thus, in JP 2006-179369 A, there is a problem in which it is difficult to obtain sufficiently electrical and mechanical connection reliability.

In addition, JP 2013-032255 A shows a lead-free glass composite, a glass frit for sealing, a glass paste for sealing and a conductive glass paste which are softened and flowed at low burning temperature and are good in thermal and chemical stability. The junction of an aluminum electric wire is not however mentioned.

The present invention is made in view of the above problems, and an object thereof is to provide solder, which is capable of joining an aluminum electric wire with high electrical and mechanical connection reliability, an aluminum wire body and a motor using the aluminum wire body.

In order to achieve the above object, the present invention provides solder joining an aluminum or aluminum alloy electric wire and a metal to be joined, wherein the solder including an oxide glass including vanadium and a conducting particle.

Further, in order to achieve the above object, the present invention provides an aluminum wire body, which is equipped with an aluminum or aluminum alloy electric wire, a metal to be joined, and a connected portion in which a body to be joined and the metal to be joined are joined by solder, wherein the connected portion is joined by the solder described above.

Further, in order to achieve the above object, the present invention provides a motor, which is equipped with a housing case, a stator coil arranged in the housing case and a rotor arranged in the inside of the stator coil, wherein the stator coil is constituted of an aluminum wire, and the end of the aluminum wire is constituted of the aluminum wire body described above.

According to the present invention, an aluminum electric wire can be joined with high electrical and mechanical connection reliability.

DESCRIPTION OF THE PREFERRED EMBODIMENTS

The embodiments of the present invention will be now described in more detail in reference to drawings and tables.

(Connected Portion of an Aluminum Wire Body)

To obtain an aluminum wire body of an aluminum electric wire with high connection reliability in the present invention, solder (an oxide glass) in a connected portion thereof is required to include vanadium. The reason why vanadium is required for the connected portion is that vanadium is compatible with aluminum and has an effect of removing an oxide film formed on the surface of aluminum during forming the connected portion. Along with removing the oxide film, because a vanadium compound phase is formed on the interface between the surface of aluminum and solder, adhesive properties are also excellent. The compound of the interface is in small quantities, and thus the compound phase has not been accurately identified. X-ray photoelectron spectroscopy, however, confirms the existence of tetravalent or lower vanadium. Vanadium metal can be observed on the above interfaces depending on production conditions.

Therefore, it is believed that the compound on the interface is a compound including tetravalent or lower vanadium (a vanadium oxide phase) or alloy (a vanadium alloy phase). This compound formed on the interface is more excellent in moisture resistance than a general oxide film of aluminum, and thus this makes a connected portion with higher reliability.

Figure 1:
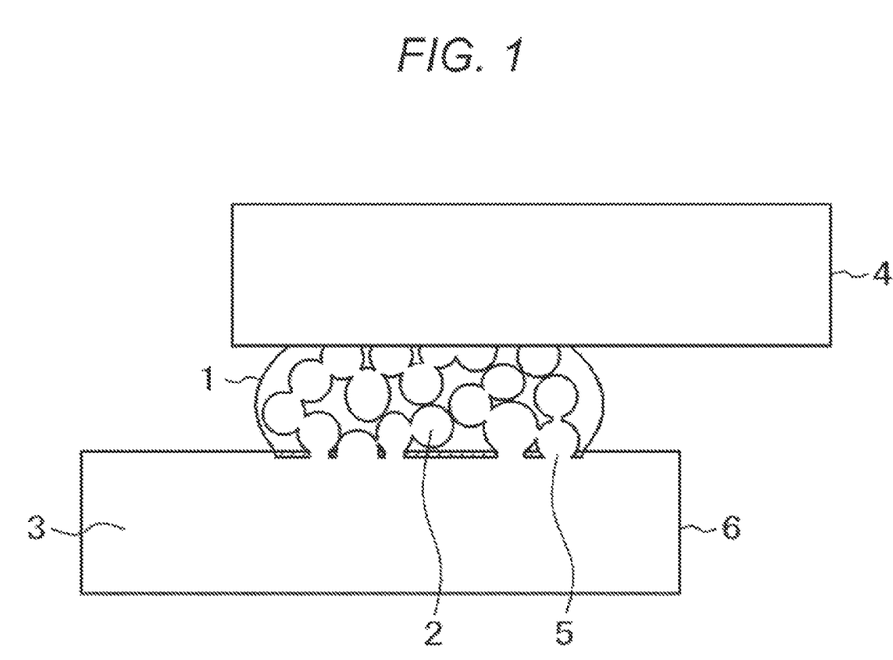
FIG. 1 is an enlarged schematic diagram of a connected portion of an aluminum wire body.

FIG. 1 shows a structure in a junction state of a connected portion in an aluminum wire body by means of a schematic diagram. The oxide glass including vanadium for junction is 1, the conducting particles (conducting metal particles) (aluminum particles) contained in the oxide glass 1 are 2, and solder is constituted of the two. The aluminum or aluminum alloy electric wire is 3, and the metal to be joined (a material to be joined) which joins to the electric wire 3 is 4 and is formed from an aluminum material or a different metal. A compound phase (or an alloy phase) formed on the interface between the electric wire 3 and the oxide glass 1 is 5, and the oxide film (alumina) formed on the surface of the electric wire 3 is 6.

According to the structure of the connected portion in FIG. 1, the oxide film 5 formed on the surface of aluminum is removed, and the electric wire 3 and the oxide glass 1 are attached via the compound phase (or the metal phase) formed on the interface between the electric wire 3 and the oxide glass 1. Aluminum particles contained in the oxide glass 1 join to the electric wire 3 as one body. By the attachment of the oxide glass 1 and the junction of conducting metal particles as described above, solder and the electric wire 3 are joined with excellent adhesive properties. Similarly, the metal to be joined 4 is also joined to the above solder with excellent adhesive properties.

The junction state of this connected portion is formed by supplying solder to the connected portion, followed by burning by heating and cooling. The supply form of solder to the connected portion is solder in the form of powder, paste, wire or sheet. A form is also thought, in which the tip of an aluminum electric wire to be joined is coated using solder in advance. Even when any form is used, in order to form a connected portion with high reliability, an oxide glass including vanadium is required.

The reason why the supply form of vanadium to a connected portion of an aluminum wire body is an oxide glass is that a reaction temperature with aluminum is reduced and the melting point of solder is lowered. In general, the melting point of vanadium oxide is high, 690° C., and a reaction with aluminum does not start until temperature reaches to the neighborhood of the melting point. It has been found, however, that by using an oxide glass including vanadium, the oxide glass (solder) is softened and flowed at low temperature and the reaction with aluminum can start. These are easily softened by heating at 200° C. or more after an oxide glass including vanadium is supplied, and a connected portion with high reliability can be formed. When forming a connected portion, junction can be promoted using e.g. ultrasonic wave in an auxiliary manner. When connecting an electric wire and a terminal fitting, by crimping the electric wire to the terminal fitting while heating, a connection terminal with high connection reliability can be formed.

(Oxide Glass)

Table 1 described below shows glass compositions which are produced and examined. The oxide glass in the present invention vitrifies vanadium and is softened and flowed at lower temperature, and thus it is desired that the composition include any one of silver, tellurium and phosphorus. As a more preferable composition of the oxide glass, the total of $Ag_2O$ and $V_2O_5$ and $TeO_2$ is 75% by mass or more in the following oxide state. When the transition point of an oxide glass produced on this condition is 250° C. or less, by melting solder by heating at approximately 300° C., a connected portion with high reliability can be formed, which is desirable.

When $Ag_2O$ is 40% by mass or more, the transition point of a glass becomes 180° C. or less, and solder can be melted by heating at low temperature, approximately 250° C., and a connected portion with high reliability can be formed, which is further desirable. Incidentally, the total of $Ag_2O$ and $V_2O_5$ and $TeO_2$ on this condition is 90% by mass or more.

Further, one or more of Fe, K, W, Ba, Sb and the like can be also contained therein as additives to adjust the crystallization tendency of a glass, heat resistant temperature and the like.

The production method for an oxide glass of the present invention is not particularly limited. Raw materials, which oxides as raw materials are combined and mixed, are put in a platinum crucible and heated at a temperature increasing rate of 5 to 10° C./min to 700 to 900° C. in an electric furnace and retained for several hours, thereby being able to produce an oxide glass. It is desired that stirring be carried out during the retention to obtain a homogeneous glass. When the crucible is taken out from the electric furnace, it is desired that for the purpose of preventing moisture adsorption on the surface of an oxide glass, a substance therein be poured on e.g. a stainless plate which is heated to approximately 100° C. in advance.

(Solder)

As the production method for solder in the form of paste of the present invention, an oxide glass produced as described above is crushed to approximately 5 μm or less using a stamp mill, a jet mill and the like and the resulting solder is used. An organic solvent to be added when solder is changed to the form of paste is not particularly limited, and α-terpineol, butyl carbitol acetate and the like commonly used can be used. A binder such as ethyl cellulose or nitrocellulose can be added thereto as needed, if it is required to maintain a form during viscosity adjustment and attachment.

It is also desired that solder in the form of paste contain at least one or more conducting metal particles selected from an aluminum or aluminum alloy particle, a copper or copper alloy particle, a silver or silver alloy particle, a tin or tin alloy particle, and a zinc or zinc alloy particle to improve electroconductivity during attachment of solder. The conducting particle content is desirably 90% by volume or less as shown in Table 4 described below, and when the content is more than that, adhesive properties worsen due to a decrease in shear strength. A conducting metal particle content of 10% by volume or more to 80% by volume or less is further desirable because electroconductivity during attachment (junction) is more improved, shear strength is high and adhesive properties are improved.

Even when conducting metal particles are contained, because the surface of conducting metal particles is covered with an oxide glass during junction as shown in FIG. 1, unlike the case of using general solder (lead-containing solder), corrosion due to potential difference caused by adsorption of e.g. moisture is less prone to occur. When aluminum is connected to each other, it is desired that aluminum be used as a conducting metal particle to prevent corrosion due to potential difference. By such constitution, electrical connection reliability can be substantially improved and retained.

The solder is softened and flowed at low temperature, and thus it is desired that the composition include any one of silver, tellurium and phosphorus. These compositions are incidentally contained in oxide glasses already.

The solder in the form of paste of the present invention is not particularly limited insofar as aluminum is used for a material to be joined along with forming the connected portion of aluminum electric wires, and the solder can be applied to a printed circuit board and semiconductor integrated circuit.

The means for processing the solder of the present invention into the form of powder, wire and sheet is not particularly limited, and for example, solder is changed to a solder paste once and the solder paste can be processed and formed into the solder in the form of wire or sheet with heating. As the means for processing solder into powder, solder is changed to a solder paste once and powdered solder can be obtained by heating and cooling the solder paste, followed by crushing. Further, the means for coating an aluminum electric wire using solder is not particularly limited, and for example, the wire can be coated by dipping the wire into melted solder (glass).

that the present invention is not limited to the description of embodiments chosen herein, and the embodiments can be combined as needed.

First Embodiment

<Production of an Oxide Glass>

Oxide glasses were produced and examined as an embodiment. Table 1 shows the compositions of the glasses (Glass No. G1 to G33). Table 2 shows the compositions of oxide glasses (Glass No. G37 to G38) in a comparative embodiment.

TABLE 1

Embodiment

| Glass No. | Glass composition (mass %) | | | | | | | | | Glass transition point [° C.] |
|---|---|---|---|---|---|---|---|---|---|---|
| | $V_2O_5$ | $TeO_2$ | $Fe_2O_3$ | $P_2O_5$ | $Ag_2O$ | $WO_3$ | $BaO$ | $Sb_2O_3$ | $K_2O$ | |
| G1 | 50 | 32 | 10 | 8 | — | — | — | — | — | 263 |
| G2 | 50 | 30 | 10 | 6 | — | 4 | — | — | — | 257 |
| G3 | 45 | 30 | 15 | 10 | — | — | — | — | — | 308 |
| G4 | 45 | 25 | 15 | 10 | — | 5 | — | — | — | 316 |
| G5 | 43 | 30 | 15 | 12 | — | — | — | — | — | 318 |
| G6 | 37 | 33 | 19 | 11 | — | — | — | — | — | 336 |
| G7 | 38 | 30 | — | 5.8 | — | 10 | 11.2 | — | 5 | 276 |
| G8 | 55 | 20 | — | 10 | — | — | 5 | 10 | — | 313 |
| G9 | 45 | 25 | — | 10 | — | — | 5 | 15 | — | 338 |
| G10 | 45 | 30 | — | 10.3 | — | 10 | 4.7 | — | — | 286 |
| G11 | 30 | 30 | — | 4.8 | 30 | — | 5.2 | — | — | 222 |
| G12 | 30 | 30 | — | 5 | 30 | 5 | — | — | — | 230 |
| G13 | 25 | 30 | — | 4.8 | 30 | 5 | 5.2 | — | — | 223 |
| G14 | 25 | 30 | — | 7.2 | 30 | — | 7.8 | — | — | 228 |
| G15 | 30 | 30 | — | 4.8 | 25 | 5 | 5.2 | — | — | 236 |
| G16 | 30 | 30 | 5 | 5 | 30 | — | — | — | — | 235 |
| G17 | 25 | 30 | 5 | 5 | 30 | 5 | — | — | — | 249 |
| G18 | 25 | 30 | — | 5 | 30 | 10 | — | — | — | 236 |
| G19 | 30 | 30 | — | 4.8 | 25 | 5 | 5.2 | — | — | 237 |
| G20 | 20 | 30 | — | 4.8 | 35 | 5 | 5.2 | — | — | 204 |
| G21 | 17 | 30 | — | 4.8 | 38 | 5 | 5.2 | — | — | 197 |
| G22 | 17 | 30 | — | — | 43 | 5 | 5 | — | — | 177 |
| G23 | 20 | 35 | — | — | 45 | — | — | — | — | 163 |
| G24 | 17 | 40 | — | — | 43 | — | — | — | — | 169 |
| G25 | 40 | 40 | — | — | 20 | — | — | — | — | 218 |
| G26 | 20 | 30 | — | — | 45 | 5 | — | — | — | 169 |
| G27 | 45 | 30 | — | — | 20 | 5 | — | — | — | 224 |
| G28 | 40 | 35 | — | — | 25 | — | — | — | — | 212 |
| G29 | 18 | 34 | — | — | 43 | — | 5 | — | — | 167 |
| G30 | 40 | 25 | — | — | 35 | — | — | — | — | 235 |
| G31 | 40 | — | — | 25 | 20 | 10 | 5 | — | — | 338 |
| G32 | 50 | — | — | 30 | 20 | — | — | — | — | 326 |
| G33 | 19 | 33 | — | — | 48 | — | — | — | — | 161 |

In addition, the materials of an aluminum electric wire are not particularly limited. Alloy materials with iron and magnesium may be used to improve strength and alloy materials with zirconium can be used to improve heat resistance.

Further, the materials of a terminal fitting joined to an aluminum electric wire are not particularly limited, and aluminum or an aluminum alloy, copper or a copper alloy and the like can be used.

(Uses of an Aluminum Wire Body)

The applications and uses of the aluminum wire body of the present invention are not particularly limited, and by utilizing high connection reliability, the aluminum wire body can be used for a wire harness for wiring for electric power supply and signal transmission in the inside of e.g. automobiles, a connecting wire of the winding of motors, a buttery cable and the like.

The present invention will be now described in more detail by way of embodiments. It should be noted, however,

TABLE 2

Comparative Embodiment

| Glass No. | Glass composition (mass %) | Glass transition point [° C.] |
|---|---|---|
| G37 | 45$Ag_2O$—45$P_2O_5$—10ZnO | 241 |
| G38 | 40$Ag_2O$—20$P_2O_5$—30$TeO_2$—10BaO | 250 |

All components were expressed by mass % (percent by mass) in terms of oxides. With attention to environments and safety, lead was not substantially contained in these glass composites having low melting points. The raw materials of components were divanadium pentoxide ($V_2O_5$), tellurium oxide ($TeO_2$), iron(III) oxide ($Fe_2O_3$), phosphorus pentoxide ($P_2O_5$), silver oxide ($Ag_2O$), tungsten oxide ($WO_3$), barium carbonate ($BaCO_3$), antimony oxide ($Sb_2O_3$) and potassium carbonate ($K_2CO_3$).

An oxide glass was produced by the following procedure.

Raw material compounds were combined and mixed according to a composition in Table 1, and 1 kg of the resulting mixed powder was put in a platinum crucible and heated at a temperature increasing rate of 5 to 10° C./min to a heating temperature of 700° C. to 900° C. using an electric furnace and retained for 2 hours. Stirring was carried out during the retention to obtain a homogeneous glass. Next, the platinum crucible was taken out from the electric furnace, and a substance therein was poured on a stainless plate heated to 100° C. in advance to obtain an oxide glass. By coarse crushing of the produced oxide glass using a stamp mill and then fine crushing using a jet mill, the oxide glass was crushed to an average particle diameter (D50) of 3.0 µm or less.

<Evaluation of the Glass Transition Point>

Figure 2:
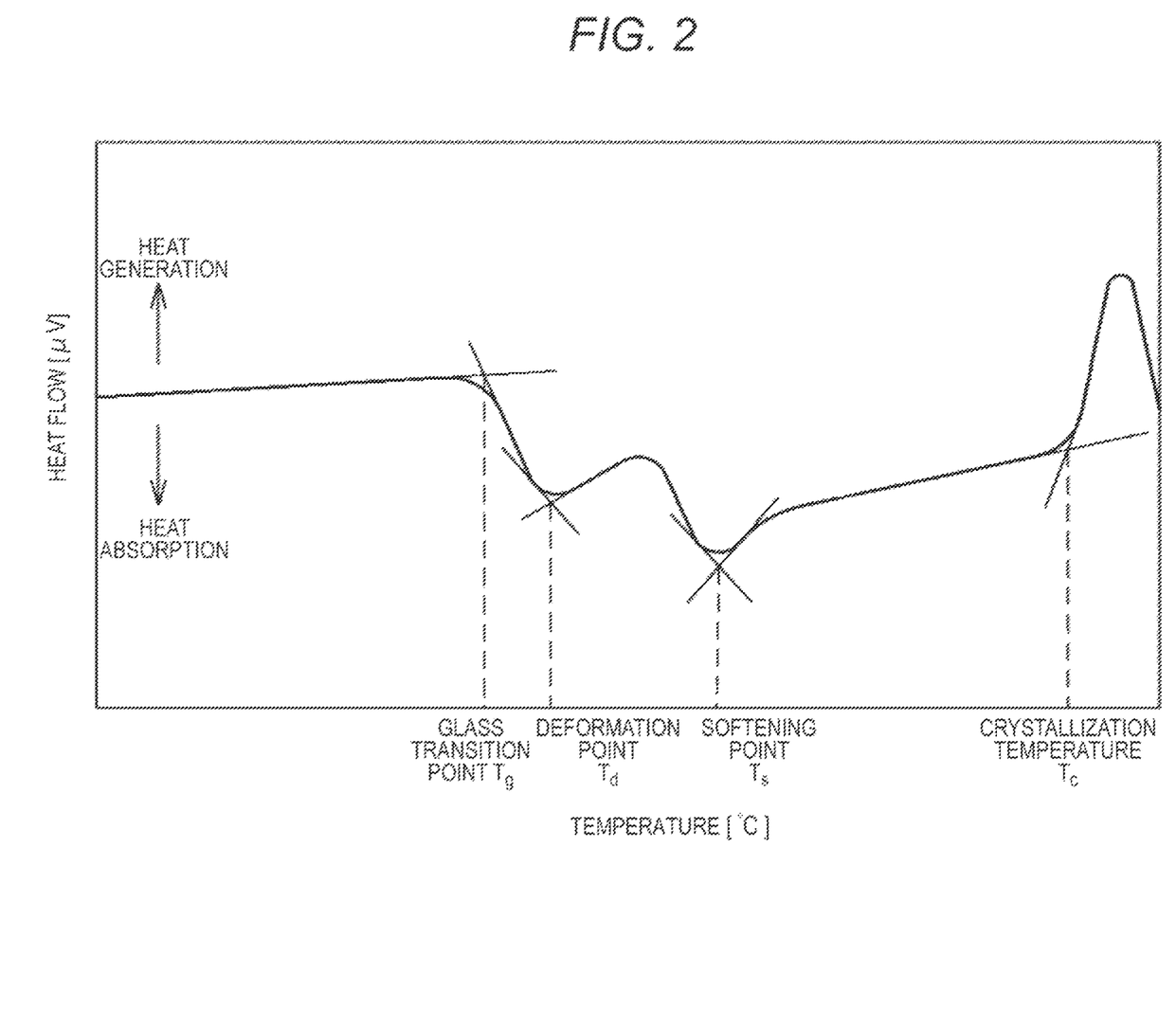
FIG. 2 is an example of a DTA curve obtained by DTA (Differential Thermal Analysis) measurement of a glass composite.

The glass poured on the stainless plate was crushed to an average particle diameter (D50) of below 20 µm using a stamp mill, and differential thermal analysis (DTA) was carried out at a temperature increasing rate of 5° C./min to measure a transition point (Tg). Alumina powder was used as a standard sample. A typical DTA curve of a glass is shown in FIG. 2. As shown in FIG. 2, Tg was considered as the starting temperature of the first endothermic peak.

<Production of Solder Pastes>

A solder paste was produced using an oxide glass particle shown in Table 1, an Al (aluminum) particle and a solvent. Globular particles with an average particle diameter of 3 µm as the Al particle, crushed powder with an average particle diameter of 3.0 µm or less as the oxide glass particle and α-terpineol as a solvent were used. The oxide glass particle content was 30% by volume relative to 70% by volume of the Al particle. The solid content of a paste consisting of the Al particle and the oxide glass particle was 70 to 75% by weight.

The produced solder paste was applied to a 20 mm square on an alumina substrate by screen printing. A film thickness after drying at 150° C. was approximately 20 µm. Thereafter, the substrate was retained at 200 to 400° C. in the air for 2 minutes, and electrical resistance was measured by the four-terminal method. As electrical resistance, ⊙ for when the specific resistance was the $10^{-5}$ Ωcm level or lower, ○ for the $10^{-4}$ Ωcm level and x for the $10^{-3}$ Ωcm level or higher were used for evaluation.

Further, the produced film was subjected to a high temperature and humidity test for moisture resistance evaluation. The high temperature and humidity test at 85° C. and 85% was carried out for 1000 hours, and ○ for when the produced film was hardly changed and x for when the film was changed to black were used for evaluation.

Similarly, a film was formed on an Al substrate using a solder paste, and an Al circular cylinder with a radius of 5 mmφ and a height of 2 mm was then put on the film. Weight was applied thereto at a pressure of 1 MPa, and this was then retained at the lowest temperature at which the resistance of each sample was evaluated as ○ or ⊙ in a range from 200° C. to 400° C. in the air for 2 minutes. The shear strength of a joined body after burning was evaluated. A shear strength of 10 MPa or more was considered as pass and shear strength lower than that was considered as rejection. The evaluation results of electrical resistance, high temperature and humidity test and shear strength are shown together in Table 3 (Paste No. P1 to P33 and P37 and P38).

As shown in Table 3, it was revealed that the produced solder pastes could reduce electrical resistance without an increase up to the melting point of aluminum. Comparison between Embodiment (Table 1) and Comparative Embodiment (Table 2) shows that when vanadium is contained in the constituents of an oxide glass, electrical resistance is reduced, moisture resistance is improved and junction strength is also excellent. It is desired that the total of $Ag_2O$ and $V_2O_5$ and $TeO_2$ be 75% by mass or more in the composition of an oxide glass because the transition point becomes 250° C. or less and electrical resistance at the time of burning at 300° C. can be reduced. Further, it is more preferred that $Ag_2O$ be 40% by mass or more because the transition point becomes 180° C. or lower and electrical resistance at the time of burning at 250° C. can be reduced. The total of $Ag_2O$ and $V_2O_5$ and $TeO_2$ on this condition is incidentally 90% by mass or more.

TABLE 3

| Paste No. | Glass No. | Electrical resistance 250° C. | 300° C. | 400° C. | Moisture resistance | Shear strength | |
|---|---|---|---|---|---|---|---|
| P1 | 1 | X | X | ⊙ | ○ | Pass | Embodiment |
| P2 | 2 | X | X | ⊙ | ○ | Pass | Embodiment |
| P3 | 3 | X | X | ⊙ | ○ | Pass | Embodiment |
| P4 | 4 | X | X | ⊙ | ○ | Pass | Embodiment |
| P5 | 5 | X | X | ⊙ | ○ | Pass | Embodiment |
| P6 | 6 | X | X | ⊙ | ○ | Pass | Embodiment |
| P7 | 7 | X | X | ⊙ | ○ | Pass | Embodiment |
| P8 | 8 | X | X | ⊙ | ○ | Pass | Embodiment |
| P9 | 9 | X | X | ⊙ | ○ | Pass | Embodiment |
| P10 | 10 | X | X | ⊙ | ○ | Pass | Embodiment |
| P11 | 11 | X | ⊙ | ⊙ | ○ | Pass | Embodiment |
| P12 | 12 | X | ⊙ | ⊙ | ○ | Pass | Embodiment |
| P13 | 13 | X | ⊙ | ⊙ | ○ | Pass | Embodiment |
| P14 | 14 | X | ⊙ | ⊙ | ○ | Pass | Embodiment |
| P15 | 15 | X | ⊙ | ⊙ | ○ | Pass | Embodiment |
| P16 | 16 | X | ⊙ | ⊙ | ○ | Pass | Embodiment |
| P17 | 17 | X | ⊙ | ⊙ | ○ | Pass | Embodiment |
| P18 | 18 | X | ⊙ | ⊙ | ○ | Pass | Embodiment |
| P19 | 19 | X | ⊙ | ⊙ | ○ | Pass | Embodiment |
| P20 | 20 | X | ⊙ | ⊙ | ○ | Pass | Embodiment |
| P21 | 21 | X | ⊙ | ⊙ | ○ | Pass | Embodiment |
| P22 | 22 | ○ | ⊙ | ⊙ | ○ | Pass | Embodiment |
| P23 | 23 | ○ | ⊙ | ⊙ | ○ | Pass | Embodiment |
| P24 | 24 | ○ | ⊙ | ⊙ | ○ | Pass | Embodiment |
| P25 | 25 | X | ⊙ | ⊙ | ○ | Pass | Embodiment |
| P26 | 26 | ○ | ⊙ | ⊙ | ○ | Pass | Embodiment |
| P27 | 27 | X | ⊙ | ⊙ | ○ | Pass | Embodiment |
| P28 | 28 | X | ⊙ | ⊙ | ○ | Pass | Embodiment |
| P29 | 29 | ○ | ⊙ | ⊙ | ○ | Pass | Embodiment |
| P30 | 30 | X | ⊙ | ⊙ | ○ | Pass | Embodiment |
| P31 | 31 | X | X | ⊙ | ○ | Pass | Embodiment |
| P32 | 32 | X | X | ⊙ | ○ | Pass | Embodiment |
| P33 | 33 | ○ | ⊙ | ⊙ | ○ | Pass | Embodiment |
| P37 | 37 | X | X | X | X | Rejection | Comparative Embodiment |
| P38 | 38 | X | X | X | X | Rejection | Comparative Embodiment |

Second Embodiment

Using Glass G29 produced in Table 1, the amount of the glass added and the Al particle content contained in a solder paste were changed as shown in Table 4, and solder pastes (PA1 to PA12) were produced in the same manner as in First embodiment. The produced solder pastes were retained at 300° C. for 2 minutes in the same manner as in First embodiment, and shear strength was then evaluated. In addition, the electrical resistance of Al between the upper and lower ends of a sample for measuring shear strength was measured. As measured values, ⊙ for below 1Ω, ○ for 1Ω or more and below 2Ω and x for more than that were used for evaluation. The results after measurement are shown together in Table 4.

Table 4 showed that the amount of oxide glass to be added was preferably 10% by volume or more (the Al particle content was 90% by volume or less) to secure adhesive properties (shear strength), and also showed that particularly 20% by volume or more to 90% by volume or less of oxide glass was more preferably contained (the Al particle content was 10% by volume to 80% by volume) to obtain good electrical attachment between Al.

TABLE 4

| Paste No. | Glass added amount (%) | Aluminum particle content (%) | Shear strength | Electrical resistance |
|---|---|---|---|---|
| PA1 | 100 | 0 | Pass | ○ |
| PA2 | 90 | 10 | Pass | ⊙ |
| PA3 | 80 | 20 | Pass | ⊙ |
| PA4 | 70 | 30 | Pass | ⊙ |
| PA5 | 60 | 40 | Pass | ⊙ |
| PA6 | 50 | 50 | Pass | ⊙ |
| PA7 | 40 | 60 | Pass | ⊙ |
| PA8 | 30 | 70 | Pass | ⊙ |
| PA9 | 20 | 80 | Pass | ⊙ |
| PA10 | 10 | 90 | Pass | ○ |
| PA11 | 5 | 95 | Rejection | ○ |
| PA12 | 0 | 100 | Rejection | ○ |

Third Embodiment

Using Glass G29 produced in Table 1, the conducting metal particle contained in a solder paste was changed as shown in Table 5, and solder pastes (PB1 to PB5) were produced in the same manner as in First embodiment. The shear strength and electrical resistance of the produced solder pastes were measured in the same manner as in Second embodiment. The results are shown together in Table 5. The results revealed that even when using any of metal particles, excellent results on both shear strength and electrical resistance were obtained.

TABLE 5

| Paste No. | Metal particle | Average particle diameter [μm] | Shear strength | Electrical resistance |
|---|---|---|---|---|
| PB1 | Ag | 1.4 | Pass | ⊙ |
| PB2 | Sn | 10 | Pass | ⊙ |
| PB3 | Sn—3Ag—0.5Cu | 5.2 | Pass | ⊙ |
| PB4 | Zn | 7 | Pass | ⊙ |
| PB5 | Sn—9Zn | 5 | Pass | ⊙ |

Fourth Embodiment

Using the solder pastes PA4 and PB1 to PB5 produced in First to Third embodiments, a film was formed on an Al substrate in the same manner as in First embodiment, and a Cu circular cylinder with a radius of 5 mmϕ and a height of 2 mm was then put on the film. Weight was applied thereto at a pressure of 1 MPa, and this was then retained at 300° C. in the air for 2 minutes. Shear strength and electrical resistance were measured in the same manner as in Second embodiment. Consequently, the shear strength was passed and electrical resistance was ⊙ in all samples. As can be seen from the above, it was found that even when a joined body included different kinds of materials, Al and Cu, the produced solder paste could form excellent junction.

Fifth Embodiment

Figure 3:
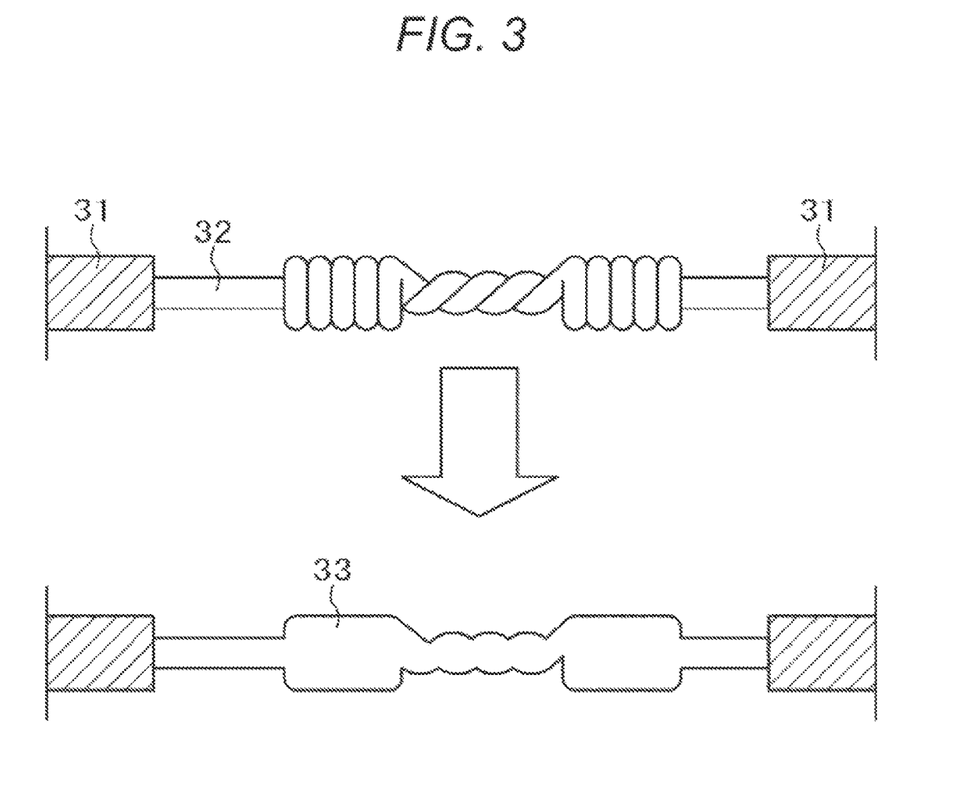
FIG. 3 is a schematic diagram showing an example of a connected portion of an aluminum wire body.

Using the solder pastes PA4 and PB1 to PB5 produced in First to Third embodiments, the connection of aluminum electric wires was examined. A schematic diagram thereof is shown in FIG. 3. First, the ends of the aluminum electric wires 31 were peeled, and the exposed aluminum conductors 32 were mechanically and simply connected each other by twisting the conductors as in FIG. 3 to constitute a connected portion. Thereafter, the solder pastes PA4 and PB1 to PB5 produced above were applied to the connected portion, and the connected portion was then heated with an industrial drier at 300° C. for a few minutes and cooled (burning) to constitute the solder connecting portion 33. It was recognized that the electrical connection of aluminum electric wires in the solder connecting portion 33 was good in all samples.

Sixth Embodiment

Using the solder pastes PA4 and PB1 to PB5, the connection of an aluminum electric wire and a copper electric wire was examined in the same manner as in Fifth embodiment. A connected portion was produced in the same manner as in Fifth embodiment except that the other material connecting the aluminum electric wire was changed to a copper electric wire. It could be recognized that the electrical connection in the solder connecting portion was good in all samples after production. The produced samples were subjected to the high temperature and humidity test in the same manner as in First embodiment. The results could confirm that the decay rate of electrical connection in the solder connecting portion was low in all samples, which was good.

Seventh Embodiment

Figure 4:
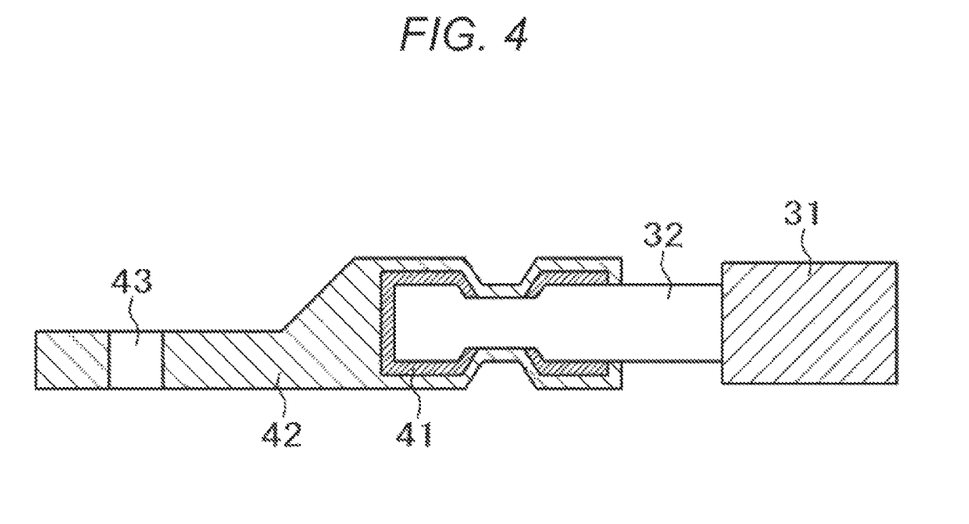
FIG. 4 is a schematic diagram showing an example of a connected portion of an aluminum electric wire and a terminal.

Using the solder pastes PA4 and PB1 to PB5 produced in First to Third embodiments, the connected portion of an aluminum electric wire and a terminal fitting was examined. A schematic diagram of a portion connected with a terminal fitting is shown in FIG. 4. First, the end of the aluminum electric wire 31 was peeled, and to the exposed aluminum conductor 32, the produced solder pastes PA4 and PB1 to PB5 were applied and dried with an industrial drier at 150° C. for 20 seconds. Thereafter, the aluminum conductor 32 of the aluminum electric wire, to which a solder paste was applied, was inserted into the insertion hole of the terminal fitting 42, followed by crimping, and further the portion was heated with an industrial drier at 250° C. for approximately 2 minutes and cooled to complete the connected portion as in FIG. 4. Thereafter, the terminal fitting 42 of the aluminum electric wire was produced in the same manner, and the terminal fittings 42 were connected via the opening portion 43. The results could confirm that the electrical connection was good in all samples. The solder paste applied and burned by heating is shown by 41. In this embodiment, the connected portion is constituted of 32, 41 and 42.

A conducting cycle test in a salt spray atmosphere was carried out to the produced samples 1000 times, and it was recognized that a remarkable increase in resistance was not observed.

Eighth Embodiment 8

The aluminum wire body, to which a terminal was connected in the same manner as in Seventh embodiment, was prepared and connected to a wire harness separately prepared, and the operation of the harness was checked. The results confirmed that electrical connection in the connected portion was good and the operation was normal.

Ninth Embodiment 9

Figure 5:
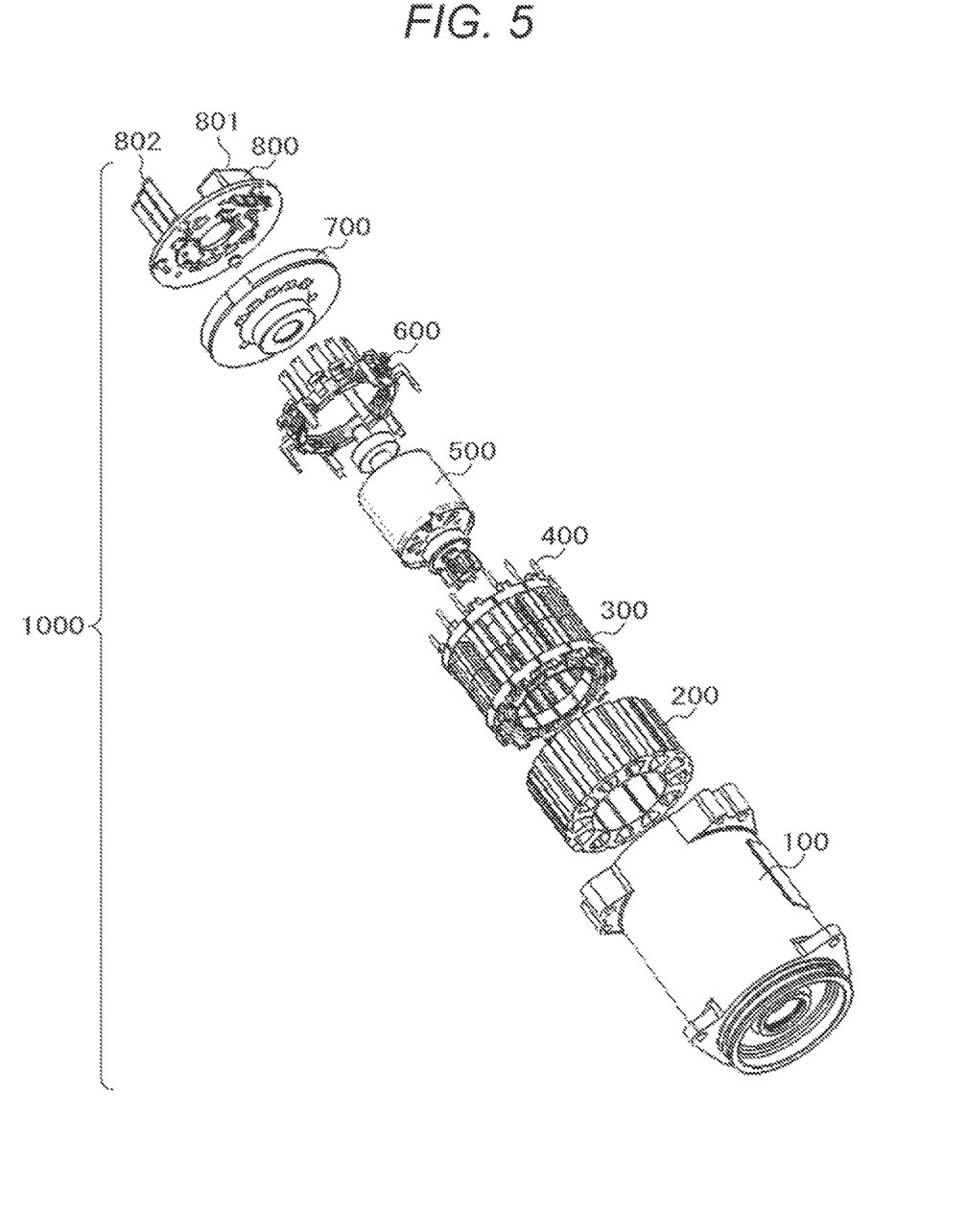
FIG. 5 is a schematic diagram showing an example of a motor using an aluminum electric wire.

FIG. 5 is a structural drawing of a motor produced using the aluminum wire body in the embodiment of the present invention. The motor 1000 is constituted of the stator core 200 including a magnetic substance fixed on the iron or aluminum housing case 100; the conductive stator coil 400 wound on the stator core 200; the bobbin 300 including a non-conductive matter to insulate the stator core 200 and the stator coil 400; the rotor 500 revolvably maintained on the inner diameter side of the stator 200; the bus bar 600 for gathering the leads of the stator coil 400 or making the input line of the motor, the neutral of the Y-connection and the like; the bracket 700 equipped on the input side of the motor 1000; and the substrate 800 on which e.g. the input line 802 and the relay switch 801 are gathered.

The steps of assembling the above motor are as follows. The motor is produced via a first step of incorporating the stator coil into the stator core 200; after that, a second step of obtaining a structure in which the stator core 200, into which the stator coil 400 was incorporated, was fixed on the housing case 100 by pressing circumferential several points of the stator core 200, into which the stator coil 400 was incorporated, into the housing case 100; and after that, a third step of fitting the bracket 700 or a jig on the structure so that the stator core 200 and the coil end of the stator coil 400 protruding from the axial edge of the stator core 200 in the axial direction would be surrounded by the bracket 700 or the jig and the housing case 100.

Alternatively, a structure mold-shaped using a mold material may be obtained by a production process via, after the third step, a fourth step of, by injecting the mold material in a fluid state into a portion surrounded by the bracket 700 or the jig and the housing case 100, filling the coil end, spaces of the stator core 200, spaces of the stator coil 400, spaces between the stator core 200 and stator coil 400, and spaces between the stator core 200 and the housing case 100 with the mold material; after that, a fifth step of solidifying the mold material; and after that, a sixth step of removing the jig.

In the above motor constitution, the stator coil 400 was constituted of an aluminum wire, and the end of the aluminum wire was connected to the terminal fitting 42 using the solder pastes PA4 and PB1 to PB5 produced in First and Third embodiments in the same manner as in Seventh embodiment to constitute an aluminum wire body. Further, a motor was produced by connecting the terminal fitting 42 of the aluminum wire body to the bus bar 600. When the operation of the produced motor was checked, it could be recognized that electrical connection in the connected portion was good and all motors operated without problems.

What is claimed is:

1. Solder joining an aluminum or aluminum alloy electric wire and a metal to be joined, wherein
   the solder comprises an oxide glass including vanadium and a conducting particle, and the oxide glass in a total amount of the oxide glass and the conducting particle is 40% to 90% by volume.

2. The aluminum wire body according to claim 1, wherein the conducting particle contained in the solder is 90% by volume or less.

3. The solder according to claim 1, wherein the oxide glass comprises 40% by mass or more of $Ag_2O$ in terms of oxides and the glass transition point is 180° C. or less.

4. The solder according to claim 1, wherein the oxide glass further comprises one or more of Te, P, Fe, K, W, Ba and Sb.

5. The solder according to claim 1, wherein the conducting particle is a conducting particle selected from an aluminum or aluminum alloy particle, a copper or copper alloy particle, a silver or silver alloy particle, a tin or tin alloy particle, and a zinc or zinc alloy particle.

6. An aluminum wire body, which is equipped with an aluminum or aluminum alloy electric wire, a metal to be joined, and a connected portion in which a body to be joined and the metal to be joined are joined by the solder according to claim 1.

7. The aluminum wire body according to claim 6, wherein the solder is supplied to the connected portion in any form of powder, paste, wire, and sheet, and is burned to join the electric wire and the metal to be joined.

8. The aluminum wire body according to claim 7, wherein the solder is supplied in the form of paste and comprises a conducting particle selected from an aluminum or aluminum alloy particle, a copper or copper alloy particle, a silver or silver alloy particle, a tin or tin alloy particle, and a zinc or zinc alloy particle, and the oxide glass comprises vanadium and an organic solvent.

9. An aluminum wire body comprising:
   an aluminum or aluminum alloy electric wire,
   a metal to be joined, and
   a connected portion in which the electric wire and the metal to be joined are joined by solder containing an oxide glass comprising vanadium and a conducting particle,
   wherein the solder, which is burned in the connected portion, comprises a vanadium alloy phase.

10. The aluminum wire body according to claim 6, wherein
    the solder, which is burned in the connected portion, comprises a vanadium oxide phase.

11. The aluminum wire body according to claim 9, wherein
    the electric wire and the metal to be joined are aluminum conductors, and are mechanically connected in the connected portion, and the solder, in the form of powder or paste, is then applied thereto and burned to join the aluminum conductors.

12. The aluminum wire body according to claim 6, wherein
    the solder further comprises at least any one of silver, tellurium and phosphorus.

* * * * *